Patented May 23, 1950

2,508,814

UNITED STATES PATENT OFFICE 2,508,814

LEUCO SULFATE ESTERS OF 1:1'-DI-ANTHRAQUINONYLAMIDES OF DIBASIC CARBOXYLIC ACIDS

Samuel Coffey, David Alexander Whyte Fairweather, and David Ernest Hathway, Blackley, Manchester, England, assignors to Imperial Chemical Industries Limited, a corporation of Great Britain No Drawing. Application November 18, 1947, Serial No. 786,796. In Great Britain November 25, 1946

7 Claims. (Cl. 260—368)

This invention relates to the manufacture of new dyestuffs and in particular it relates to the manufacture of new leuco sulphuric esters from the 1:1'-di-anthraquinonylamides of dibasic carboxylic acids.

It has been proposed to make sulphuric esters of leuco derivatives of vat dyestuffs by treating the leuco derivative of the vat dyestuff with for example chlorosulphonic acid in the presence of a tertiary base for example pyridine or by treating the vat dyestuffs itself in tertiary base suspension in the presence of a metal with sulphur trioxide or with a substance which can give rise to sulphur trioxide in the reaction mixture. Also in British Specification 274,156 it was proposed to react the vat dyestuff in tertiary base suspension with the metal before the addition of sulphur trioxide, and a process was described for the manufacture of derivatives of vat dyestuffs by reacting a quaternary ammonium halide which may be obtained by the reaction between a tertiary organic base and an alkyl halide, in tertiary organic base suspension, with a metal, reacting the product with a vat dyestuff, and then reacting the resulting mixture with the product obtained by the interaction of a tertiary base with a reagent adapted to yield the sulphuric anhydride compound of the tertiary base, for example an alkyl chlorsulphonate, chlorsulphonic acid, oleum or sulphur trioxide. Pyridine and dimethylaniline were mentioned as examples of bases which could be used in the process.

According to our experiments however the 1:1'-dianthraquinonyl-amides of dibasic acids cannot be converted into the sulphuric esters of the corresponding leuco derivatives by any of the methods hitherto known for the purpose of converting vat dyestuffs to the sulphuric esters of their leuco derivatives and in fact no sulphuric esters of the leuco derivatives of these dyestuffs have hitherto been described. We have now found that these dyestuffs can be converted into the sulphuric esters of the corresponding leuco derivatives when instead of using pyridine or other tertiary base in the above described process, there is used an organic amide in which the hydrogen atoms attached to the amido nitrogen atoms have been replaced by hydrocarbon radicles or substituted hydrocarbon radicles.

According to our invention therefore we provide a process for the manufacture of new sulphuric esters of leuco derivatives from vat dyestuffs which contain the radicle

—NH—CO—R—CO—NH— linking an alpha position of one anthraquinone nucleus to an alpha position of a second anthraquinone nucleus where —CO—R—CO— is the radicle of a dibasic acid and where the anthraquinone nuclei may carry substituents, characterised in that the formation of the leuco sulphuric ester is carried out in the presence of an organic amide in which the hydrogen atoms attached to the amide nitrogen atom have been replaced by hydrocarbon radicles or substituted hydrocarbon radicles.

As examples of radicles of dibasic acids there may be mentioned the radicle of oxalic acid —CO—CO—, and the radicles of tere- and isophthalic acids —CO—C$_6$H$_4$—CO—.

Examples of dyestuffs which may be converted into their leuco sulphuric esters by the process of the invention are terephthal-4:4'- and 5:5'-dibenzoylamino - 1:1' - dianthraquinonylamides, (which may be obtained by the action of 1 molecular proportion of terephthalyl chloride on 2 molecular proportions of 1-amino-4- or 1-amino-5-benzoylamino-anthraquinones) and isophthal-5:4' - dibenzoylamino - 1:1' - dianthraquinonyl - amide (which may be obtained by the process described in Example 2 of British Specification No. 476,255).

The formation of the leuco sulphuric ester may be carried out by treating the parent vat dyestuff in the presence of a metal and an amide as hereinbefore defined with sulphur trioxide or with the addition compound of sulphur trioxide and an organic amide or tertiary base or with any known substance for forming sulphuric esters from vat dyestuffs in the presence of metals or from leuco compounds or metal salts thereof or complex compounds comprising the metal salts thereof. By a known substance we mean a substance actually used for this purpose or whose use is disclosed in the literature on the subject.

Alternatively instead of using the vat dyestuffs in the presence of a metal there may be used the metal salts of corresponding leuco derivatives. For example there may be used the zinc salt or the complex compound comprising the zinc salt obtained by reacting the dyestuff with zinc in the presence of an amide and a salt such as for example potassium ethyl sulphate.

As examples of suitable amides for use in the reaction there may be mentioned the amides derived from carboxylic acids for example dimethylformamide, diethylformamide, dimethylacetamide and tetramethylurea and amides derived from sulphonic acids for example N:N-diethyl-p-toluenesulphonamide. Diluents such as for example acetone and acetonitrile may also be added to the reaction mixture.

The products made by the process of this invention may be isolated by pouring the reaction mixture into an aqueous solution of sodium carbonate, filtering and distilling off the amide from the filtrates and then salting out the sodium salts of the leuco sulphuric esters from the concentrated filtrates.

The products may be converted to dry powders by any of the processes hitherto known for making dry powders from leuco sulphuric esters and may be used for dyeing, padding and printing textile materials when shades are obtained similar to those obtained from the parent vat dyestuff by the normal vat dyeing processes.

The invention is illustrated but not limited by the following examples in which the parts are by weight.

Example 1

A mixture of 40 parts of dimethylformamide, 2 parts of zinc dust, 0.6 part of sodium 2-naphthalene sulphonate and 4.1 parts of terephthal-4:4' - dibenzoylamino - 1:1' - dianthraquinonylamide is stirred at 65–70° C. for 45 minutes in a vessel through which a current of nitrogen is passed. The deep purple reaction mixture obtained is cooled to 0° C. The product obtained by reacting 20 parts of dimethylformamide with 10.5 parts of methyl chlorosulphonate is then added and the mixture is stirred for 30 minutes at 0° C. The yellow coloured reaction mixture so obtained is poured into a solution of 15 parts of sodium carbonate in 300 parts of water. The zinc residues are filtered off and the yellow filtrate is distilled in vacuo to remove dimethylformamide.

The leuco sulphuric ester is salted out with common salt as a yellow crystalline precipitate and may be dried after admixture with sodium carbonate and an agglutinant. When the new dyestuff is applied to fabrics by the methods of padding, printing or dyeing previously used for leuco sulphuric esters, fast reddish-orange shades are obtained.

Example 2

A suspension of 4 parts of zinc dust and 1 part of tetraethylammonium iodide in 100 parts of dimethylformamide is stirred at 20° C. in a vessel through which a current of nitrogen is passed. 8.14 parts of terephthal-5:5'-dibenzoylamino-1:1'-dianthraquinonylamide are added over a period of 40 minutes. The mixture is stirred for 20 hours at 20° C. and then cooled to 0° C. The product obtained by reacting 40 parts of dimethylformamide with 21 parts of methyl chlorosulphonate is then added. The mixture is stirred for 30 minutes at 0° C. and the greenish-yellow reaction product is poured into a solution of 30 parts of sodium carbonate in 600 parts of water. The leuco sulphuric ester is isolated as described in Example 1. The product is dissolved in 400 parts of 1% aqueous sodium carbonate solution and re-precipitated by adding 17 parts of sodium chloride. The purified leuco sulphuric ester which is precipitated as a brown-yellow precipitate is filtered off and may be converted to a dry powder by mixing with alkali and an agglutinant and drying.

Example 3

A mixture of 40 parts of N-formomorpholide, 10 parts of acetone, 4 parts of zinc, 1 part of methyltriethylammonium chloride and 5.8 parts of terephthal-1:1'-dianthraquinonylamide (obtained by the action of 1 molecular proportion of terephthalyl chloride on 2 molecular proportions of 1-aminoanthraquinone) is stirred at 60° C. for 1 hour in a vessel through which a stream of nitrogen is passed. The crimson reaction mixture is cooled to 20° C. and the reaction product of 37.5 parts of methylchlorosulphonate and 60 parts of N-formomorpholide is then added. The mixture is stirred for 30 minutes at 20° C. The reaction mixture is then poured into 500 parts of aqueous 10% sodium carbonate solution, the zinc residues are removed and the leuco sulphuric ester is isolated as described in Example 1.

Example 4

A suspension of 7.4 parts of oxal-5:5'-dibenzoylamino-1:1'-dianthraquinonylamide (obtained by the action of 1 molecular proportion of oxalyl chloride on 2 molecular proportions of 1-amino-5-benzoylaminoanthraquinone), 4 parts of zinc, 1 part of sodium 2-naphthalene sulphonate and 1 part of methyltriethylammonium chloride in 75 parts of dimethylformamide is stirred at 70° C. for 1 hour under an inert atmosphere and then cooled to 0° C. 60 parts of a suspension of dimethylformamide sulphur trioxide in dimethylformamide (containing 40% sulphur trioxide) are then added to the crimson solution. The resulting greenish yellow solution is stirred for 30 minutes at 0° C. and then poured into 1000 parts of aqueous 10% sodium carbonate solution. The zinc residues are removed, the bulked filtrates are diluted to 3 litres and the yellow sodium salt of the leuco sulphuric ester is precipitated from the filtrates by the addition of sodium chloride. The product is filtered off and washed with a 10% sodium carbonate solution saturated with common salt. The product is mixed with alkali and an agglutinant and dried to give a yellow powder. When the product is applied to fabrics by the usual dyeing, padding and printing methods, fast greenish yellow shades are obtained.

Example 5

240 parts of dimethylformamide are stirred under nitrogen and 60 parts or terephthal-4:4'-dibenzoylamino-1:1' - dianthraquinonylamide, 42 parts of zinc dust, and 9 parts of sodium β-naphthalene sulphonate are added. The temperature of the mixture is raised to 60° C. and the mixture stirred at this temperature for 1 hour. The mixture so obtained is run into 113 parts of a cooled and stirred suspension of dimethylformamide sulphur trioxide in dimethylformamide (containing 40% sulphur) during a period of about 1 hour, the temperature being kept between about 0° and 5° C. The mixture is stirred for a further ¼ hour and the product is then run into 2500 parts of water containing 120 parts of sodium carbonate at 60° C. The zinc residues are filtered off and the leuco sulphate ester is salted out from 3000 parts of liquid by adding 600 parts of common salt at 40° C. The salted liquid is allowed to cool and the product, which crystallises out, is filtered off and washed with brine. The product is the same as that obtained in Example 1.

We claim:

1. The new leuco sulphuric ester derivative of terephthal-5:5'-dibenzoylamino - 1:1' - dianthraquinonylamide.

2. The new leuco sulphuric ester derivative of terephthal-4:4'-dibenzoylamino-1:1' - dianthraquinonylamide.

3. The new leuco sulphuric ester derivative of terephthal-1:1'-dianthraquinonylamide.

4. A new dyestuff which in the form of its sodium salt is represented by the formula

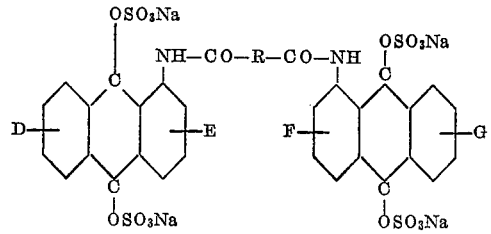

wherein D, E, F and G are selected from the group consisting of hydrogen and —NHCOC$_6$H$_5$ and wherein —CO—R—CO— is the radical of a dicarboxylic acid.

5. A process for the production of a leuco sulphuric ester of a vat dyestuff having the formula

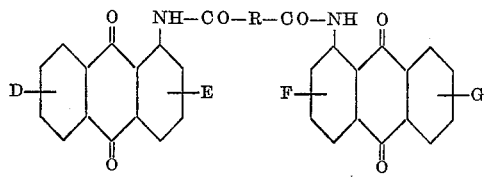

wherein D, E, F and G are selected from the group consisting of hydrogen and —NHCOC$_6$H$_5$ and wherein —CO—R—CO— is the radical of a dicarboxylic acid, characterized in that the formation of the leuco sulphuric ester is carried out in the presence of a non-vattable compound selected from the group consisting of amides of carboxylic and sulphonic acids having a general formula selected from the group consisting of

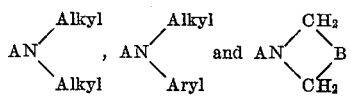

wherein the aryl group is of the benzene series and wherein A represents the acid radical of the amide and B represents the atoms required to complete a heterocyclic ring.

6. A process as claimed in claim 5, wherein the vat dyestuff is terephthal-5:5'-dibenzoylamino-1:1'-dianthraquinonyl-amide.

7. A process for the production of a leuco sulphuric ester of a vat dyestuff having the formula

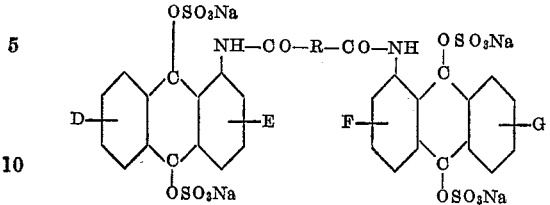

wherein D, E, F and G are selected from the group consisting of hydrogen and —NHCOC$_6$H$_5$ and wherein —CO—R—CO— is the radical of a dicarboxylic acid, characterized in that the formation of the leuco sulphuric ester is carried out in the presence of a non-vattable compound selected from the group consisting of dimethylformamide, diethylformamide, dimethylacetamide, tetramethylurea, N:N-diethyl-p-toluenesulphonamide and N-formomorpholide.

SAMUEL COFFEY.
DAVID ALEXANDER WHYTE FAIRWEATHER.
DAVID ERNEST HATHWAY.

REFERENCES CITED

The following references are of record in the file of this patent:

UNITED STATES PATENTS

| Number | Name | Date |
|---|---|---|
| 1,639,206 | Wolfram | Aug. 16, 1927 |
| 1,651,461 | Kugel | Dec. 6, 1927 |
| 1,784,379 | Munch | Dec. 9, 1930 |
| 1,949,299 | Fairweather et al. | Feb. 27, 1934 |
| 1,954,702 | Kern | Apr. 10, 1934 |
| 2,045,304 | Lulek et al. | June 23, 1936 |
| 2,123,375 | Mieg et al. | July 12, 1938 |
| 2,388,285 | Ratti et al. | Nov. 6, 1945 |

OTHER REFERENCES

Fox, "Vat Dyestuffs and Vat Dyeing" (1948), pp. 28–29.